United States Patent
Anderson et al.

(10) Patent No.: US 10,169,127 B2
(45) Date of Patent: Jan. 1, 2019

(54) COMMAND EXECUTION RESULTS VERIFICATION

(71) Applicant: International Business Machines Corporation, Armonk, NY (US)

(72) Inventors: Dale H. Anderson, Tucson, AZ (US); Paul A. Jennas, II, Tucson, AZ (US); Jason L. Peipelman, Vail, AZ (US)

(73) Assignee: International Business Machines Corporation, Armonk, NY (US)

( * ) Notice: Subject to any disclaimer, the term of this patent is extended or adjusted under 35 U.S.C. 154(b) by 748 days.

(21) Appl. No.: 14/199,778

(22) Filed: Mar. 6, 2014

(65) Prior Publication Data
US 2015/0254121 A1    Sep. 10, 2015

(51) Int. Cl.
| | | |
|---|---|---|
| G06F 9/44 | (2018.01) |
| G06F 11/07 | (2006.01) |
| G06F 9/451 | (2018.01) |
| G06F 9/455 | (2018.01) |

(52) U.S. Cl.
CPC ........ G06F 11/0751 (2013.01); G06F 9/4443 (2013.01); G06F 9/451 (2018.02); G06F 9/45512 (2013.01); G06F 11/0706 (2013.01)

(58) Field of Classification Search
CPC ....................................................... G06F 9/44
USPC .................. 717/124–127, 131–132
See application file for complete search history.

(56) References Cited

U.S. PATENT DOCUMENTS

| | | | | |
|---|---|---|---|---|
| 4,755,995 A | * | 7/1988 | Anderson | H04Q 11/0407 379/279 |
| 5,461,570 A | * | 10/1995 | Wang | A61L 2/24 700/110 |
| 5,634,098 A | * | 5/1997 | Janniro | G06F 11/3688 707/999.104 |
| 5,850,562 A | * | 12/1998 | Crump | G06F 11/3466 713/1 |
| 6,134,690 A | * | 10/2000 | Ivaturi | G06F 11/2294 714/46 |
| 6,173,440 B1 | * | 1/2001 | Darty | G06F 11/3608 714/35 |
| 6,591,211 B1 | * | 7/2003 | Schnarch | G01R 31/3185 702/108 |
| 6,598,002 B1 | * | 7/2003 | Claverie | G01R 31/008 702/121 |
| 6,721,808 B1 | | 4/2004 | Singh | |
| 7,590,509 B2 | * | 9/2009 | Riedlinger | G01R 31/2856 702/130 |
| 7,620,855 B2 | * | 11/2009 | DeCenzo | G06F 11/0775 714/48 |
| 8,156,475 B2 | * | 4/2012 | Choi | G06F 11/3688 717/124 |

(Continued)

FOREIGN PATENT DOCUMENTS

WO    2005045565 A2    5/2005

*Primary Examiner* — Jae U Jeon
(74) *Attorney, Agent, or Firm* — Kunzler, PC

(57) ABSTRACT

A computer program product for command result verification is configured to receive a command and an expected result from a command line interface, execute the command, receive one or more result codes resulting from the execution of the command, determine whether the one or more result codes satisfy the expected result, and send a response to the command line interface in response to determining whether the one or more result codes satisfy the expected result.

20 Claims, 6 Drawing Sheets

(56) References Cited

U.S. PATENT DOCUMENTS

| | | | |
|---|---|---|---|
| 8,856,211 B1* | 10/2014 | Kassamali | H04L 43/50 709/203 |
| 9,135,150 B2* | 9/2015 | Rumble | G06F 11/3692 |
| 2003/0115305 A1 | 6/2003 | Murray et al. | |
| 2003/0120464 A1* | 6/2003 | Taft | G06F 17/30899 702/186 |
| 2003/0163448 A1* | 8/2003 | Kilemba | G06F 9/45512 |
| 2004/0001443 A1* | 1/2004 | Soon | H04L 12/2697 370/244 |
| 2004/0041827 A1* | 3/2004 | Bischof | G06F 9/45512 715/704 |
| 2004/0244463 A1* | 12/2004 | Dale, Jr. | G01B 11/275 73/1.75 |
| 2005/0232163 A1* | 10/2005 | Zabihi | H04L 41/082 370/254 |
| 2006/0095812 A1* | 5/2006 | Gerard | G06F 11/0715 714/38.1 |
| 2007/0022324 A1* | 1/2007 | Chang | G06F 11/3672 714/38.14 |
| 2007/0135933 A1* | 6/2007 | Panesse | B25J 9/1671 700/17 |
| 2007/0263773 A1* | 11/2007 | Malik | H04L 43/50 379/1.01 |
| 2008/0126918 A1* | 5/2008 | Boardman | G06F 11/3664 714/819 |
| 2010/0235831 A1* | 9/2010 | Dittmer | G06F 9/45558 718/1 |
| 2011/0055635 A1* | 3/2011 | Vecera | G06F 11/3692 714/37 |
| 2012/0226462 A1* | 9/2012 | Rucker | G06F 11/2294 702/108 |
| 2014/0109063 A1* | 4/2014 | Schissel | G06F 11/368 717/127 |

* cited by examiner

# COMMAND EXECUTION RESULTS VERIFICATION

FIELD

The subject matter disclosed herein relates to the verification of expected results for commands executed by a command line interface and particularly relates to the verification of expected results for command executed by a command line interface in script mode.

BACKGROUND

Command line interfaces can be run in three different modes: interactive mode, single shot mode, and script mode. Interactive mode allows a user to type in a command, hit <ENTER>, see the result, and type in another command, all while holding open a single connection to the managed system. Single shot mode allows a user to send a single command down in one call to the command line interface framework, allowing the user to add a single executable command to scripts that logs into the system, sends one command, displays the result, and logs off of the system. Script mode allows a user to define a list of commands that will be executed one after another after logging into the system just once, displaying the results of each in turn and stopping if any errors occur. Single shot mode allows users to test whether commands generate the expected result through the use of complex scripts. Script mode is more efficient for executing commands but lacks the ability to determine whether the commands generate the expected results.

BRIEF SUMMARY

A computer program product for command result verification is configured to receive a command and an expected result from a command line interface, execute the command, receive one or more result codes resulting from the execution of the command, determine whether the one or more result codes satisfy the expected result, and send a response to the command line interface in response to determining whether the one or more result codes satisfy the expected result. The expected result may be an indication of a successful command execution, errors generated from the execution of a command, an unexpected result from the execution of a command, or a set of result codes generated from the execution of a command.

In one embodiment, where the expected result is an indication of an unexpected result from the execution of a command, sending a response to the command line interface in response to determining whether the one or more result codes satisfy the expected result includes sending a success code to the command line interface. In another embodiment, where the expected result is an indication of a successful command execution, determining whether the one or more result codes satisfy the expected result includes determining whether each result code of the one or more result codes indicates successful execution of the command. Furthermore, in this embodiment, sending a response to the command line interface in response to determining whether the one or more result codes satisfy the expected result includes (i) sending a success code to the command line interface in response to determining that each result code of the one or more result codes indicates successful execution of the command and (ii) sending an error message to the command line interface in response to determining that a result code of the one or more result codes indicates an error generated by the execution of the command. In some instances, this error message includes an error code indicating an unexpected error and each result code of the one or more result codes indicating an error generated by the execution of the command.

In an embodiment, where the expected result is an indication of errors generated by the execution of the command, determining whether the one or more result codes satisfy the expected result includes determining whether each result code of the one or more result codes indicates an error generated by the execution of the command. Furthermore, in this embodiment, sending a response to the command line interface in response to determining whether the one or more result codes satisfy the expected result includes (i) sending a success code to the command line interface in response to determining that each result code of the one or more result codes indicates an error generated by the execution of the command and (ii) sending an error message to the command line interface in response to determining that a result code of the one or more result codes indicates a successful execution of the command. In certain instances, this error message includes an error code indicating an unexpected success and each result code of the one or more result codes indicating a successful execution of the command.

In one embodiment, where the expected result is a set of expected result codes, determining whether the one or more result codes satisfy the expected result includes determining whether the one or more result codes matches a subset of the set of expected result codes. Furthermore, in this embodiment, sending a response to the command line interface in response to determining whether the one or more result codes satisfy the expected result includes (i) sending a success code to the command line interface in response to determining that the one or more result codes matches a subset of the set of expected result codes and (ii) sending an error message to the command line interface in response to determining that a result code of the one or more result codes does not match any result code of the set of expected result codes. In certain instances, this error message includes an error code indicating an unexpected result and each result code of the one or more result codes that does not match any result code of the set of expected result codes.

A method for command result verification includes receiving a command and an expected result from a command line interface, executing the command, receiving one or more result codes resulting from the execution of the command, determining whether the one or more result codes satisfy the expected result, and sending a response to the command line interface in response to determining whether the one or more result codes satisfy the expected result. The expected result may be an indication of a successful command execution, errors generated from the execution of a command, an unexpected result from the execution of a command, or a set of result codes generated from the execution of a command.

An apparatus for command result verification includes a command module receiving a command and an expected result from a command line interface, an operations module executing the command, a result collection module receiving one or more result codes resulting from the execution of the command, a verification module determining whether the one or more result codes satisfy the expected result, and a response module sending a response to the command line interface in response to determining whether the one or more result codes satisfy the expected result. The expected result may be an indication of a successful command execution, errors generated from the execution of a command, an unexpected result from the execution of a command, or a set of result codes generated from the execution of a command.

In one embodiment, where the expected result is an indication of an unexpected result from the execution of a command, sending a response to the command line interface in response to determining whether the one or more result codes satisfy the expected result includes sending a success code to the command line interface. In another embodiment, where the expected result is an indication of a successful command execution, determining whether the one or more result codes satisfy the expected result includes determining whether each result code of the one or more result codes indicates successful execution of the command. Furthermore, in this embodiment, sending a response to the command line interface in response to determining whether the one or more result codes satisfy the expected result includes (i) sending a success code to the command line interface in response to determining that each result code of the one or more result codes indicates successful execution of the command and (ii) sending an error message to the command line interface in response to determining that a result code of the one or more result codes indicates an error generated by the execution of the command. In some instances, this error message includes an error code indicating an unexpected error and each result code of the one or more result codes indicating an error generated by the execution of the command.

In an embodiment, where the expected result is an indication of errors generated by the execution of the command, determining whether the one or more result codes satisfy the expected result includes determining whether each result code of the one or more result codes indicates an error generated by the execution of the command. Furthermore, in this embodiment, sending a response to the command line interface in response to determining whether the one or more result codes satisfy the expected result includes (i) sending a success code to the command line interface in response to determining that each result code of the one or more result codes indicates an error generated by the execution of the command and (ii) sending an error message to the command line interface in response to determining that a result code of the one or more result codes indicates a successful execution of the command. In certain instances, this error message includes an error code indicating an unexpected success and each result code of the one or more result codes indicating a successful execution of the command.

In one embodiment, where the expected result is a set of expected result codes, determining whether the one or more result codes satisfy the expected result includes determining whether the one or more result codes matches a subset of the set of expected result codes. Furthermore, in this embodiment, sending a response to the command line interface in response to determining whether the one or more result codes satisfy the expected result includes (i) sending a success code to the command line interface in response to determining that the one or more result codes matches a subset of the set of expected result codes and (ii) sending an error message to the command line interface in response to determining that a result code of the one or more result codes does not match any result code of the set of expected result codes. In certain instances, this error message includes an error code indicating an unexpected result and each result code of the one or more result codes that does not match any result code of the set of expected result codes.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
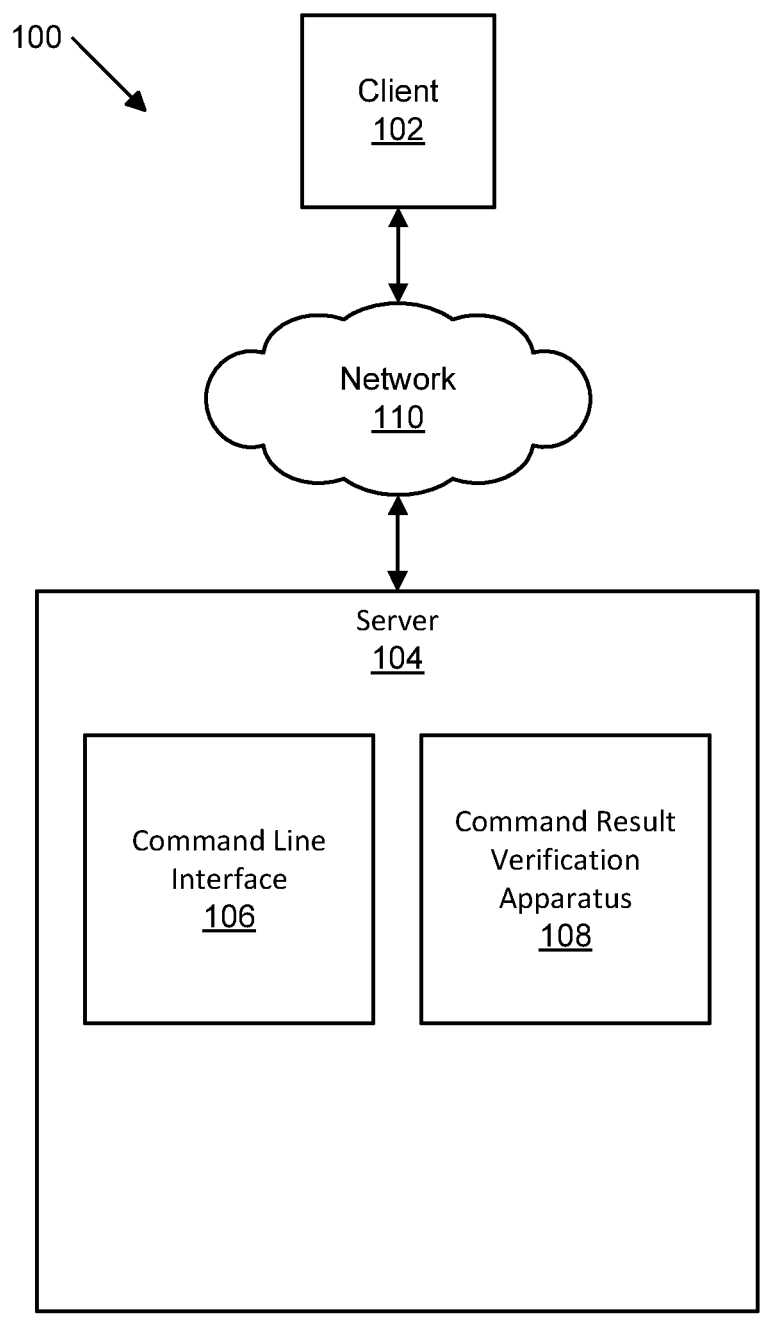
FIG. 1 is a schematic block diagram illustrating one embodiment of a system for command result verification.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

The description of elements in each figure may refer to elements of proceeding figures. Like numbers refer to like elements in all figures, including alternate embodiments of like elements. Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by program code. The program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The program code may also be loaded onto a computer, other programmable data processing apparatus, or other devices to cause a series of operational steps to be performed on the computer, other programmable apparatus or other devices to produce a computer implemented process such that the program code which executed on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

The description of elements in each figure may refer to elements of proceeding figures. Like numbers refer to like elements in all figures, including alternate embodiments of like elements.

FIG. 1 is a schematic block diagram illustrating one embodiment of a system 100 for command result verification. The system 100 includes a client 102, a server 104, a command line interface 106, a command result verification apparatus 108, and a network 110, which are described below.

The system 100, in one embodiment, includes a server 104 with a command line interface 106 and a command result verification apparatus 108. The server may be any computer accessible by a client 102 over a network 110, including but not limited to a database server, a mainframe server, a workstation, a desktop computer, etc. The client 102 may be any electronic device with a display and the ability to accept user input that capable of accessing the server 104. For example, the client 102 may be a laptop or desktop computer, a tablet, a smartphone, a television, etc. The network 110 may include a local area network ("LAN"), a wide area network ("WAN"), wireless network, cellular network, the Internet, a fiber optic network, or the like. In one embodiment, the network 110 includes multiple networks. For example, the network 110 may include a cellular network along with another network capable Internet connection. In another example, the network 110 includes a wireless network along with a wired network. The network 110 may include switches, routers, servers, cabling and other equipment known to those in the art.

A command line interface 106 is a tool for interacting with a system 100 by typing commands to perform specific tasks. These tasks include querying the state of system resources or manipulating the system 100 by creating, deleting, moving, or formatting system resources. A system resource may be a physical object (e.g., disk drive, memory, CPU) or a logical object (e.g., logical disk volume, virtual memory, active software process). A command may be accompanied by one or more command flags, parameters, or both. A command flag modifies the behavior of a query command. In an embodiment, a command flag may also signify the type (e.g., text string, number, boolean) of one or more parameters accompanying the query command. A parameter is a variable that can modify the behavior of a query command or a command flag. In some embodiments, a parameter can be a boolean condition (e.g., "state"=running; "% complete">75). In another embodiment, a parameter can be a string of alphanumeric characters. For example, a parameter may be a name of a system resource or an expected result from the execution of a command. In certain embodiments, a parameter can be a number. For example, a parameter may be a measurement of time, size, progress, or rate.

Figure 2:
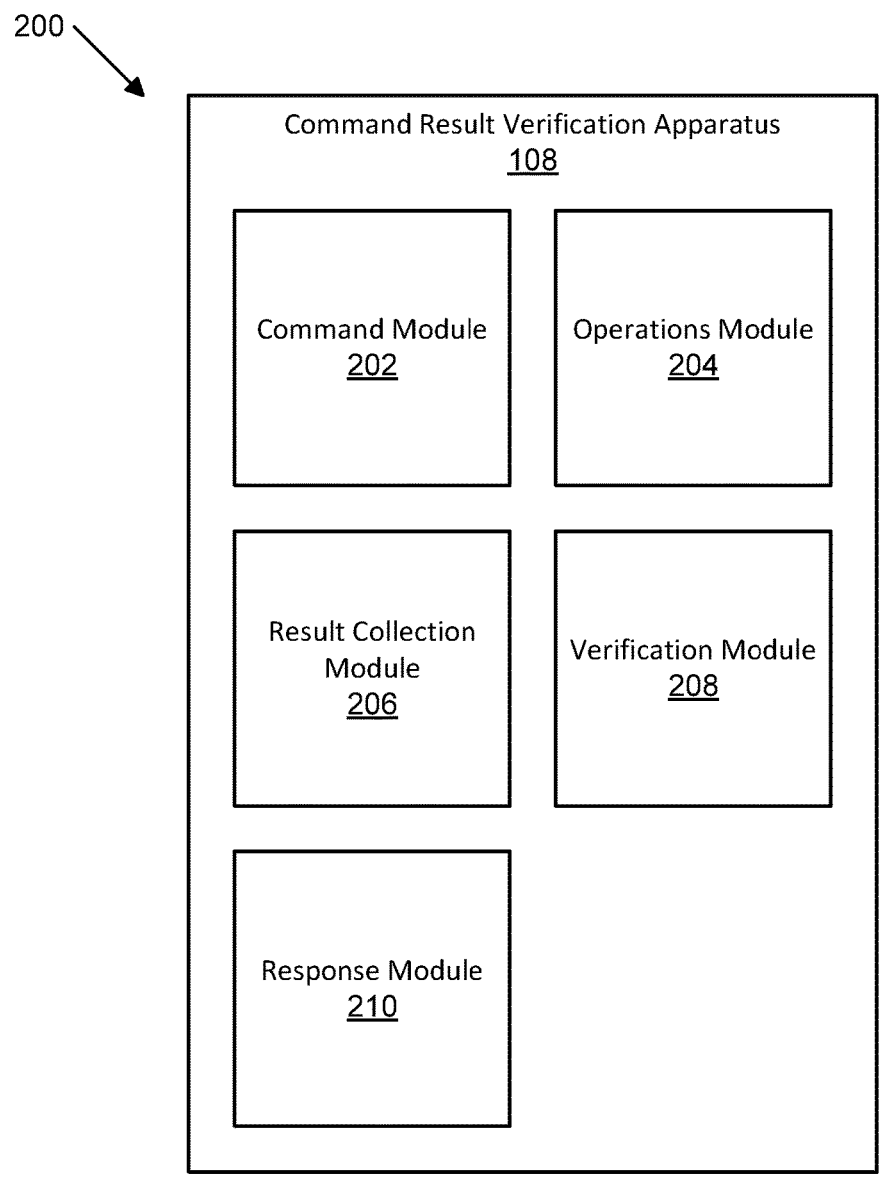
FIG. 2 is a schematic block diagram illustrating one embodiment of an apparatus for command result verification.

FIG. 2 is a schematic block diagram illustrating one embodiment of an apparatus 200 for command result verification. The apparatus 200 includes one embodiment of a command result verification apparatus 108 with a command module 202, an operations module 204, a result collection module 206, a verification module 208, and a response module 210, which are described below.

In one embodiment, the command module 202 receives a command and an expected result from a command line interface 106. An expected result is a number, a string of letters, or a string of alphanumeric characters that describes an acceptable result of executing the command on the server 104 (e.g., 0, 1, ffff, "all," "success," "error"). In one embodiment, the expected result describes an acceptable result indicating the command was executed successfully. In another embodiment, the expected result describes an acceptable result indicating that one or more errors occurred when the command was executed. In certain embodiments, the expected result describes an acceptable result that includes all results from executing the command on the server 104. In yet another embodiment, the expected result may correspond to the acceptable actual return or exit status codes generated by the server 104 when the command is executed. In some embodiments, the command module 202 receives a command accompanied by one or more command flags, parameters, or both.

In a certain embodiment, the command module 202 receives a command and an expected result from a command line interface 106 running in a "script" mode, where the command line interface reads the command and related expected result from a script file and passes it to the command module 202. The script file may contain a plurality of commands and expected results related to these commands, which the command line interface 106 can pass to the command module 202 individually in some order.

The operations module 204 executes the command received from the command line interface. In one embodiment, the operations module 204 executes the command along with the one or more command flags and/or parameters that accompanied the command.

The results collection module 206 receives one or more result codes resulting from the execution of the command. Execution of a command causes the creation of one or more processes to perform the required tasks. Once a process finishes performing its task or is prevented from performing its task due to an error, it terminates with an exit status or return code. The exit status or return code may indicate either a successful execution of the command or that an error occurred, and if so, the specific error. In one embodiment, a result code is an exit status and/or return code generated from the execution of the command. The result code may be a number, a string of letters, or a string of alphanumeric characters.

The verification module 208 determines whether the one or more result codes resulting from the execution of the command satisfy the expected result. In one embodiment, where the expected result is an indication of success, the verification module 208 determines whether the one or more result codes satisfy the expected result by determining whether each result code of the one or more result codes indicate a successful execution of the command. In another embodiment, where the expected result is an indication of error, the verification module 208 determines whether the one or more result codes satisfy the expected result by determining whether each result code of the one or more result codes indicate an error occurred when the command was executed. In certain embodiments, where the expected result includes a set of one or more result codes, the verification module 208 determines whether the one or more result codes satisfy the expected result by determining whether the one or more result codes matches a subset of the set of expected result codes.

The response module 210 sends a response to the command line interface 106 in response to the verification module 208 determining whether the one or more result codes satisfy the expected result. In one embodiment, where the expected result indicates either a successful execution of the command or errors, the response module 210 sending a response to the command line interface 106 in response to the verification module 208 determining whether the one or more result codes satisfy the expected result comprises sending a success code to the command line interface. In this embodiment, the response module 210 will always send a success code to the command line interface 106. This behavior is desirable in scenarios where a user wishes to ignore an error resulting from the execution of a command, such as setting up a testing environment. For example, if a test environment requires the creation of a logical object that may already exist, a command to create the logical object will result in an error and normally cause the command line interface to stop executing. Here, the response module 210 ignores the inconsequential error and allows the command line interface 106 to continue executing the test in script mode. A success code may be a number, a string of letters, or a string of alphanumeric characters.

In another embodiment, where the expected result indicates a successful command execution, the response module 210 sending a response to the command line interface 106 in response to the verification module 208 determining whether the one or more result codes satisfy the expected result comprises (i) sending a success code to the command line interface 106 in response to the verification module 208 determining that each result code of the one or more result codes indicates successful execution of the command and (ii) sending an error message to the command line interface 106 in response to the verification module 208 determining that a result code of the one or more result codes indicates an error generated by the execution of the command. In an embodiment, the error message comprises an error code indicating unexpected error and each result code of the one or more result codes indicating an error generated by the execution of the command. An error code may be a number, a string of letters, or a string of alphanumeric characters.

In yet another embodiment, where the expected result indicates errors, the response module 210 sending a response to the command line interface 106 in response to the verification module 208 determining whether the one or more result codes satisfy the expected result comprises (i) sending a success code to the command line interface 106 in response to the verification module 208 determining that each result code of the one or more result codes indicates an error generated by the execution of the command and (ii) sending an error message to the command line interface 106 in response to the verification module 208 determining that a result code of the one or more result codes indicates a successful execution of the command. In an embodiment, the error message comprises an error code indicating unexpected success and each result code of the one or more result codes indicating a successful execution of the command.

In still another embodiment, where the expected result is a set of expected result codes, the response module 210 sending a response to the command line interface 106 in response to the verification module 208 determining whether the one or more result codes satisfy the expected result comprises (i) sending a success code to the command line interface 106 in response to the verification module 208 determining that the one or more result codes matches a subset of the set of expected result codes and (ii) sending an error message to the command line interface 106 in response to the verification module 208 determining that a result code of the one or more result codes does not match any result code of the set of expected result codes. In an embodiment, the error message comprises an error code indicating an unexpected result had occurred and each result code of the one or more result codes indicating a successful execution of the command.

Figure 3:
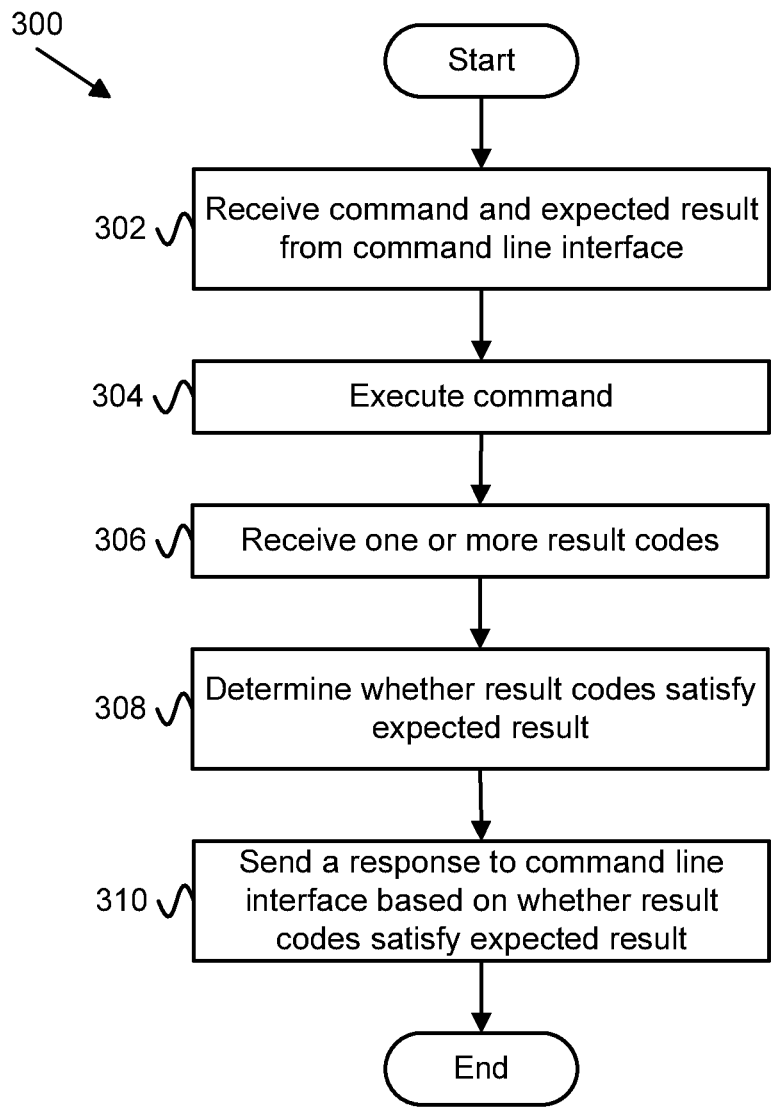
FIG. 3 is a schematic flow chart illustrating one embodiment of a method for command result verification.

FIG. 3 is a schematic block diagram illustrating one embodiment of a method 300 for command result verification. The method 300 begins and receives 302 a command and an expected result from a command line interface 106. The method 300 executes 304 the command and receives 306 one or more result codes resulting from the execution of the command. The method 300 determines 308 whether the one or more result codes satisfy the expected result. The method 300 sends 310 a response to the command line interface 106 based on whether the one or more result codes satisfied the expected result.

Figure 4:
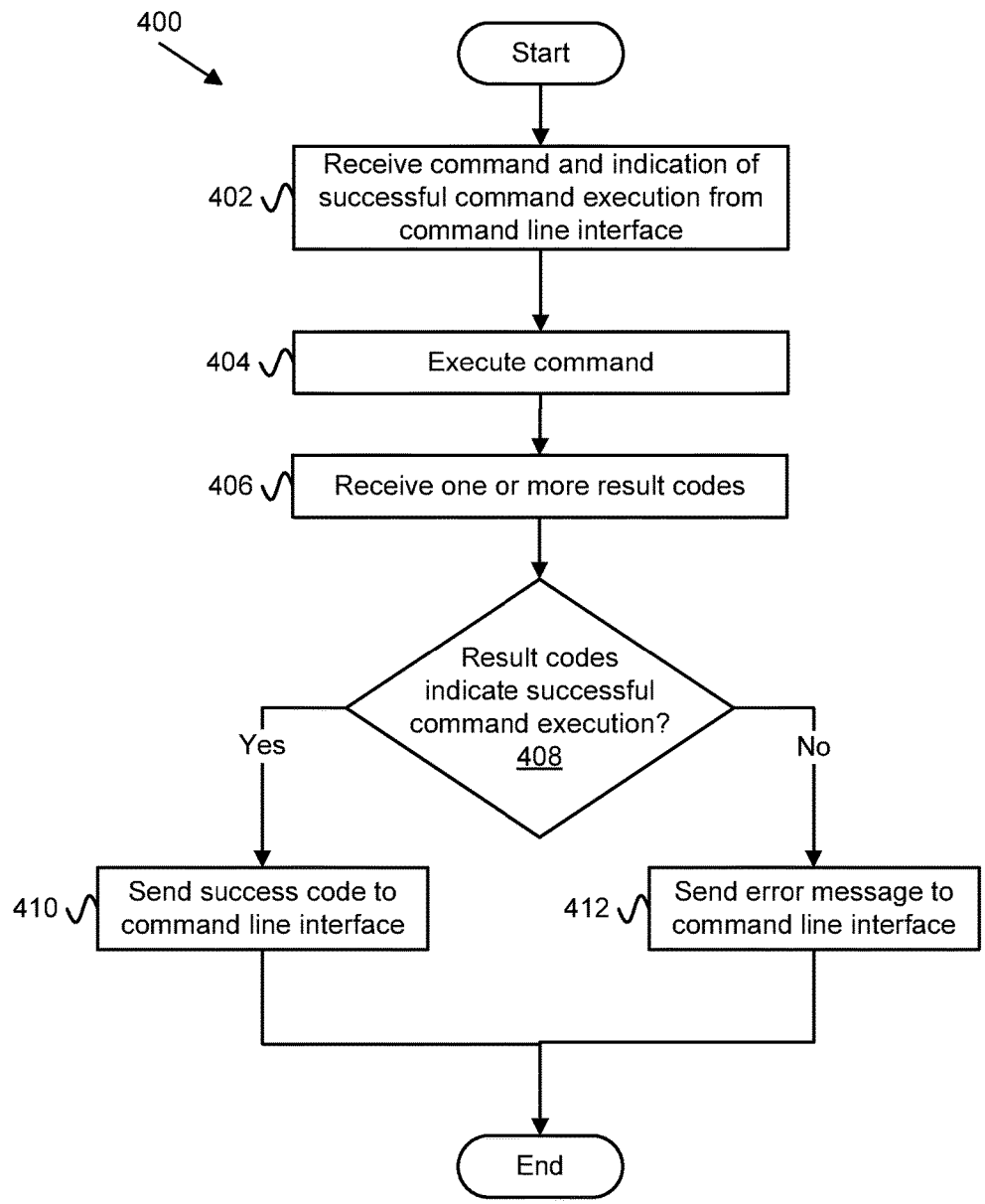
FIG. 4 is a schematic block diagram illustrating one embodiment of another method for command result verification.

FIG. 4 is a schematic block diagram illustrating one embodiment of another method 400 for command result verification. The method 400 begins and receives 402 a command and an expected result from a command line interface 106. The method 400 executes 404 the command and receives 406 one or more result codes resulting from the execution of the command. The method 400 determines 408 whether the one or more result codes indicate a successful command execution. If the one or more result codes indicate successful command execution, the method 400 sends 410 a success code to the command line interface 106. If a result code of the one or more result codes indicate errors generated by the execution of the command, the method 400 sends 412 an error message to the command line interface 106. In an embodiment, the error message comprises an error code indicating unexpected error and each result code of the one or more result codes indicating an error generated by the execution of the command.

Figure 5:
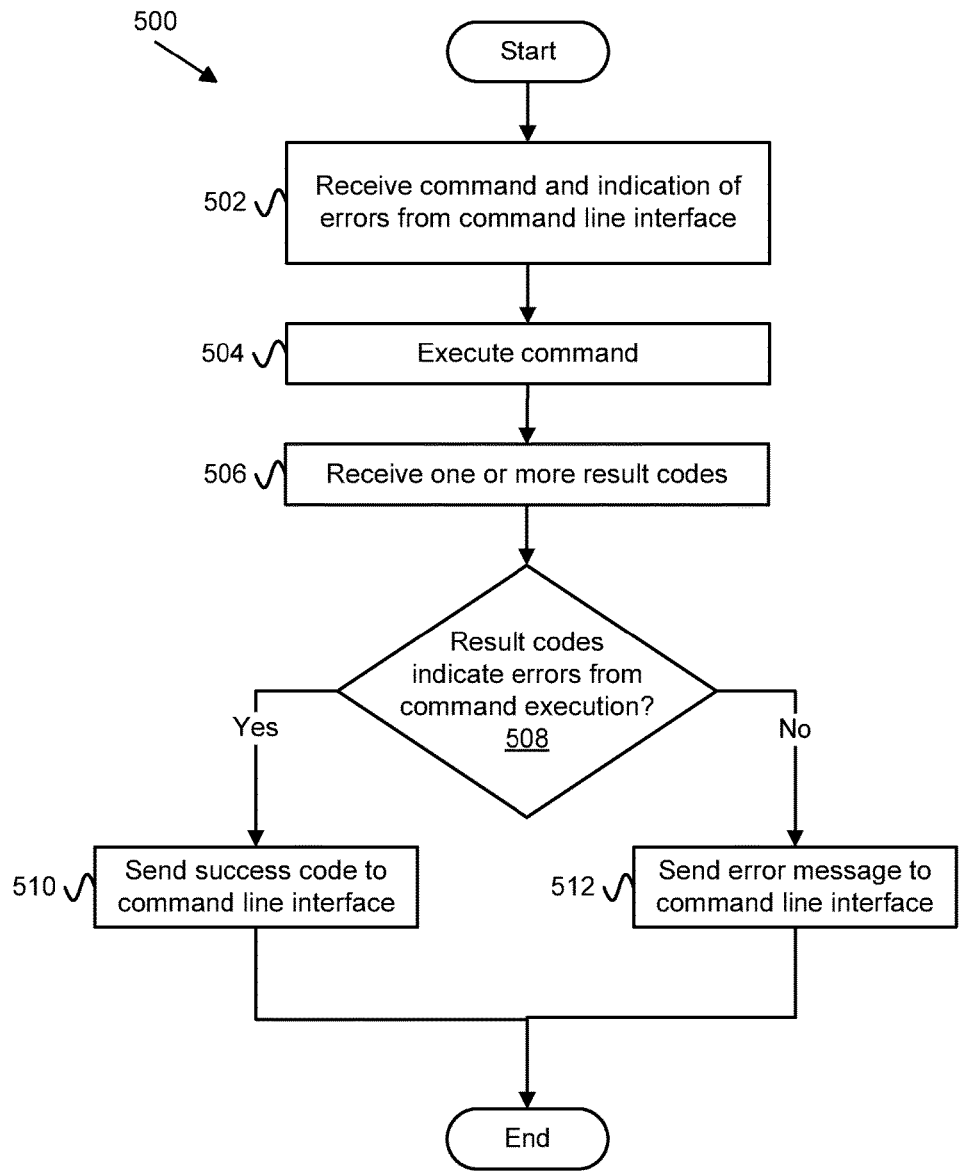
FIG. 5 is a schematic block diagram illustrating one embodiment of still another method for command result verification.

FIG. 5 is a schematic block diagram illustrating one embodiment of still another method 500 for command result verification. The method 500 begins and receives 502 a command and an expected result from a command line interface 106. The method 500 executes 504 the command and receives 506 one or more result codes resulting from the execution of the command. The method 500 determines 508 whether the one or more result codes indicate errors generated by the execution of the command. If the one or more result codes indicate an error generated by the execution of the command, the method 500 sends 510 a success code to the command line interface 106. If a result code of the one or more result codes indicates a successful command execution, the method 500 sends 512 an error message to the command line interface 106. In an embodiment, the error message comprises an error code indicating unexpected success and each result code of the one or more result codes indicating a successful execution of the command.

Figure 6:
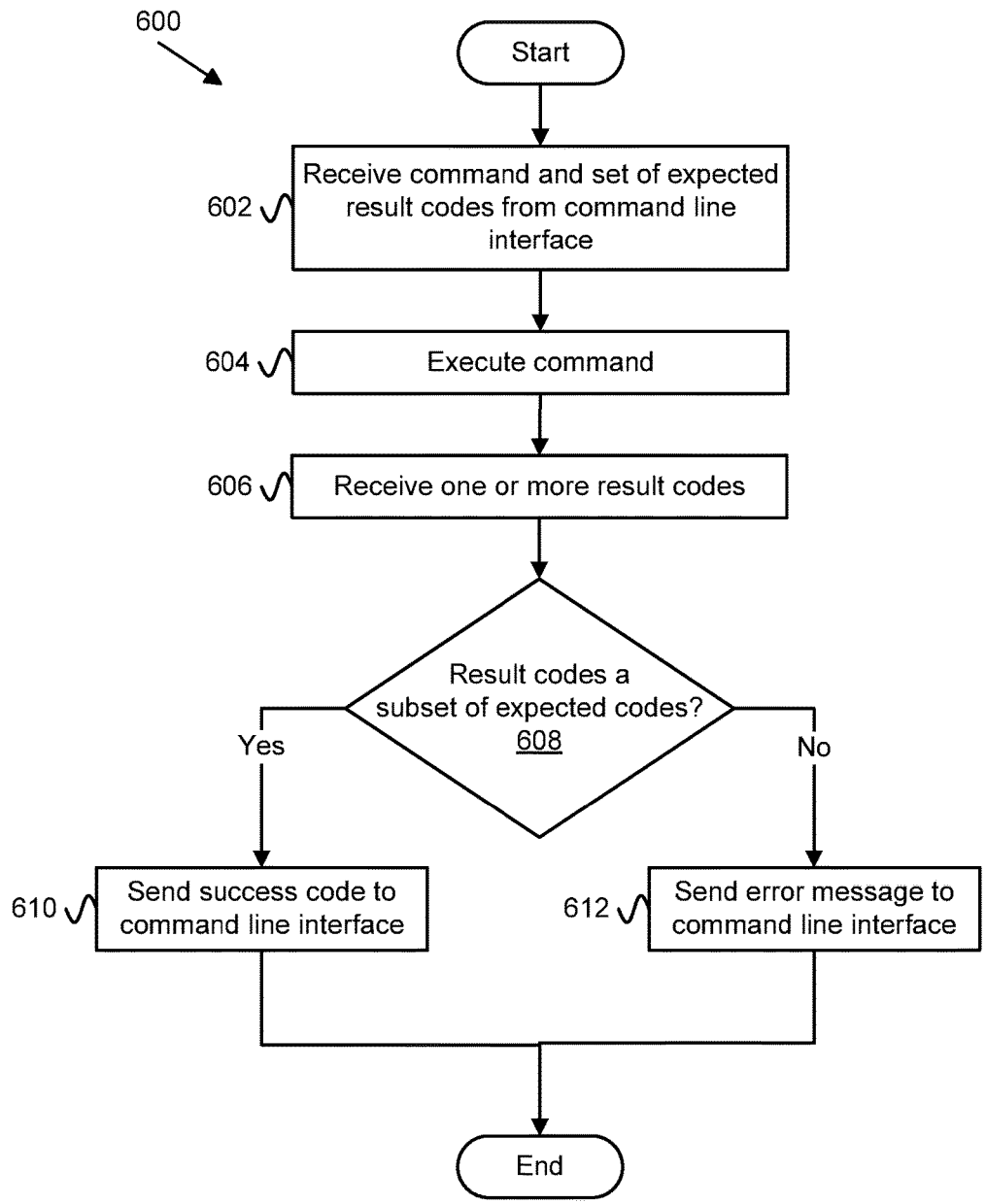
FIG. 6 is a schematic block diagram illustrating one embodiment of yet another method for command result verification.

FIG. 6 is a schematic block diagram illustrating one embodiment of yet another method 600 for command result verification. The method 600 begins and receives 602 a command and a set of expected result codes from a command line interface 106. The method 600 executes 604 the command and receives 606 one or more result codes resulting from the execution of the command. The method 600 determines 608 whether the one or more result codes match a subset of the set of expected result codes. If the one or more result codes match a subset of the set of expected result codes, the method 600 sends 610 a success code to the command line interface 106. If a result code of the one or more result codes does not match any result code of the subset of result codes, the method 600 sends 612 an error message to the command line interface 106. In an embodiment, the error message comprises an error code indicating an unexpected result had occurred and each result code of the one or more result codes indicating a successful execution of the command.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product comprising a computer readable storage medium that is not a transitory signal per se, the computer readable storage medium having computer readable codes stored thereon that cause one or more devices to conduct a method comprising:

receiving, by a processor, a file including a plurality of commands and an expected result related to the plurality of commands from a command line interface, the command line interface operating in a script mode that allows a user, with a single login to the command line interface, to define a list of commands to be executed in order by the command line interface;

executing the plurality of commands to create one or more processes for performing one or more tasks corresponding to the plurality of commands;

performing the one or more tasks;

generating one or more result codes corresponding to performance of the one or more tasks, the one or more result codes comprising a first indication of successful command execution or a second indication of errors;

determining whether the one or more result codes satisfy the expected result based on the first indication or the second indication in the one or more result codes matching the expected result; and sending a response to the command line interface in response to determining whether the one or more result codes satisfy the expected result, wherein:

the response includes one of an error message and a success code, the error message comprises an error code indicating one of an unexpected error and an unexpected success in the one or more result codes, determining whether the one or more result codes satisfy the expected results comprises determining whether the first indication of successful command execution or the second indication of errors matches at least a subset of the expected results, sending the response to the command line interface comprises:

sending the success code to the command line interface in response to determining a match, and sending the error code to the command line interface in response to determining a non-match, the error code comprises one of:

a first error indicating an unexpected error in the one or more result codes in response to the subset of expected results including a successful result, and a second error indicating an unexpected success in the one or more result codes in response to the subset of expected results including an error result.

2. The computer program product of claim 1, wherein:
the expected result comprises the successful result;
determining whether the one or more result codes satisfy the expected result comprises determining that the first indication of successful execution of the plurality of commands in the one or more result codes matches the successful result; and
sending the response to the command line interface comprises sending the success code to the command line interface.

3. The computer program product of claim 1, wherein:
the expected result comprises the error result;
determining whether the one or more result codes satisfy the expected result comprises determining that the second indication of errors in the one or more result codes matches the error result; and
sending the response to the command line interface comprises sending the success code to the command line interface.

4. The computer program product of claim 1, wherein the file is a script file.

5. The computer program product of claim 1, wherein:
the expected result comprises the successful result;
determining whether the one or more result codes satisfy the expected result comprises determining that the first indication of successful execution of the plurality of commands in the one or more result codes matches the error result; and
sending the response to the command line interface comprises sending the error code to the command line interface.

6. The computer program product of claim 1, wherein:
the expected result comprises the error result;
determining whether the one or more result codes satisfy the expected result comprises determining that the second indication of error in the one or more result codes matches the successful result; and
sending the response to the command line interface comprises sending the error code to the command line interface.

7. The computer program product of claim 1, wherein:
the response further includes a success message comprising the success code; and
the success code indicates one of an expected error and an expected success in the one or more result codes.

8. The computer program product of claim 1, wherein:
the first error code includes the unexpected error in response to the subset of the expected results including the error result for the first indication of successful command execution; and
the second error includes the unexpected success in response to the subset of the expected results including the successful result for the second indication of errors.

9. A method comprising:
receiving, by a processor, a file including a plurality of commands and an expected result related to the plurality of commands from a command line interface operating in a script mode that allows a user, with a single login to the command line interface, to define a list of commands to be executed one after another by the command line interface;
executing the plurality of commands to create one or more processes for performing one or more tasks corresponding to the plurality of commands;
performing the one or more tasks;
generating one or more result codes corresponding to performance of the one or more tasks, the one or more result codes comprising a first indication of successful command execution or a second indication of errors;
determining whether the one or more result codes satisfy the expected result based on the first indication or the second indication in the one or more result codes matching the expected result; and
sending a response to the command line interface in response to determining whether the one or more result codes satisfy the expected result,
wherein:
the response includes one of an error message and a success code,
the error message comprises an error code indicating one of an unexpected error and an unexpected success in the one or more result codes,
determining whether the one or more result codes satisfy the expected results comprises determining whether the first indication of successful command execution or the second indication of errors matches at least a subset of the expected results,
sending the response to the command line interface comprises:
sending the success code to the command line interface in response to determining a match, and
sending the error code to the command line interface in response to determining a non-match,
the error code comprises one of:
a first error indicating an unexpected error in the one or more result codes in response to the subset of expected results including a successful result, and
a second error indicating an unexpected success in the one or more result codes in response to the subset of expected results including an error result.

10. The method of claim 9, wherein:
the expected result comprises the error result;
determining whether the one or more result codes satisfy the expected result comprises determining that the second indication of errors in the one or more result codes matches the error result; and
sending the response to the command line interface comprises sending the success code to the command line interface.

11. The method of claim 9, wherein:
the expected result comprises the successful result;
determining whether the one or more result codes satisfy the expected result comprises determining that the first indication of successful execution of the plurality of commands in the one or more result codes matches the successful result; and
sending the response to the command line interface comprises sending the success code to the command line interface.

12. The method of claim 9, wherein:
the expected result comprises the error result;
determining whether the one or more result codes satisfy the expected result comprises determining that the second indication of errors in the one or more result codes matches the successful result; and sending the response to the command line interface comprises sending the error code to the command line interface.

13. The method of claim 9, wherein:
the expected result comprises the successful result;
determining whether the one or more result codes satisfy the expected result comprises determining that the first indication of successful execution of the plurality of commands in the one or more result codes matches the error result; and
sending the response to the command line interface comprises sending the error code to the command line interface.

14. The method of claim 9, wherein receiving the file comprises receiving a script file.

15. An apparatus comprising:
at least one of a processor, a hardware circuit, and programmable hardware device facilitating a command line interface operating in a script mode that allows a user, with a single login to the command line interface, to define a list of commands to be executed in order by the command line interface;
a command module receiving a file including a plurality of commands and an expected result related to the plurality of commands from the command line interface;
an operations module executing the plurality of commands to create one or more processes for performing one or more tasks corresponding to the plurality of commands and performing the one or more tasks;
a result collection module generating one or more result codes corresponding to performance of the one or more tasks, the one or more result codes comprising a first indication of successful command execution or a second indication of errors;
a verification module determining whether the one or more result codes satisfy the expected result based on the first indication of successful command execution or the second indication of errors in the one or more result codes matching the expected result; and
a response module sending a response to the command line interface in response to the verification module determining whether the one or more result codes satisfy the expected result,
wherein:
the response includes one of an error message and a success code,
the error message comprises an error code indicating one of an unexpected error and an unexpected success in the one or more result codes,
determining whether the one or more result codes satisfy the expected results comprises determining whether the first indication of successful command execution or the second indication of errors matches at least a subset of the expected results,
sending the response to the command line interface comprises:
sending the success code to the command line interface in response to determining a match, and
sending the error code to the command line interface in response to determining a non-match,
the error code comprises one of:
a first error indicating an unexpected error in the one or more result codes in response to the subset of expected results including a successful result, and
a second error indicating an unexpected success in the one or more result codes in response to the subset of expected results including an error result.

16. The apparatus of claim 15, wherein:
the expected result comprises the successful result;
the verification module that determines whether the one or more result codes satisfy the expected result comprises the verification module determining that the first indication of successful execution of the plurality of commands in the one or more result codes matches the successful result; and
the response module that sends the response to the command line interface comprises the response module sending the success code to the command line interface.

17. The apparatus of claim 15, wherein:
the expected result comprises the error result;
the verification module that determines whether the one or more result codes satisfy the expected result comprises the verification module determining that the second indication of errors in the one or more result codes matches the error result; and
the response module that sends the response to the command line interface comprises the response module sending the success code to the command line interface.

18. The apparatus of claim 15, wherein:
the expected result comprises the successful result;
the verification module determining whether the one or more result codes satisfy the expected result comprises the verification module determining that the first indication of successful execution of the plurality of commands in the one or more result codes matches the error result; and
the response module sending the response to the command line interface comprises the response module sending the error code to the command line interface.

19. The apparatus of claim 15, wherein:
the expected result comprises the error result;
the verification module determining whether the one or more result codes satisfy the expected result comprises the verification module determining that the second indication of errors in the one or more result codes matches the successful result; and
the response module sending the response to the command line interface comprises the response module sending the error code to the command line interface.

20. The apparatus of claim 15, wherein the file is a script file.

* * * * *